United States Patent
Kenney

(10) Patent No.: US 8,749,277 B2
(45) Date of Patent: Jun. 10, 2014

(54) HALF BRIDGE APPARATUS AND HALF BRIDGE CONTROL METHOD

(75) Inventor: Richard Kenney, Crewe (GB)

(73) Assignee: Siemens Aktiengesellschaft, München (DE)

( * ) Notice: Subject to any disclaimer, the term of this patent is extended or adjusted under 35 U.S.C. 154(b) by 249 days.

(21) Appl. No.: 13/160,117

(22) Filed: Jun. 14, 2011

(65) Prior Publication Data

US 2012/0013323 A1 Jan. 19, 2012

(30) Foreign Application Priority Data

Jul. 19, 2010 (EP) ..................................... 10169965

(51) Int. Cl.
*H03K 17/56* (2006.01)

(52) U.S. Cl.
USPC .......................................... 327/109; 327/112

(58) Field of Classification Search
USPC ........ 363/16–17, 20, 21.02, 56.04, 56.08, 97, 363/98, 127, 132; 327/108, 110, 111, 109, 327/112, 391; 323/222, 224, 225, 282, 288, 323/271, 272
See application file for complete search history.

(56) References Cited

U.S. PATENT DOCUMENTS

| | | | | |
|---|---|---|---|---|
| 5,365,118 A * | 11/1994 | Wilcox | .......................... | 327/109 |
| 5,729,165 A * | 3/1998 | Lou et al. | ...................... | 327/112 |
| 6,215,329 B1 * | 4/2001 | Campardo et al. | .............. | 326/88 |
| 6,714,067 B1 | 3/2004 | Farrenkopf | | |
| 7,046,040 B2 * | 5/2006 | Guedon | .......................... | 326/88 |

OTHER PUBLICATIONS

H. Lutz, W. Wendt: "Taschenbuch der Regelungstechnik", 2003, Verlag Harri Deutsch, Frankfurt, XP002615187, ISBN: 3-8171-1705-1 * p. 617, Paragraph 12.2.5.2*; Book.

* cited by examiner

*Primary Examiner* — Rajnikant Patel
(74) *Attorney, Agent, or Firm* — Henry M. Feiereisen LLC

(57) ABSTRACT

A half bridge method and apparatus that provides a desired output using pulse width modulation and the predicted condition of a power supply is disclosed. The power supply is operatively connected to a first one the switch drivers of the switching elements of the half bridge. The condition of the power supply is predicted using of a model of power supply operating parameters. This model is used in conjunction with a signal applied to a second one of the switch drivers of the switching elements of the half bridge to determine whether an operating criterion for the power supply is satisfied. If the condition is satisfied then a signal to the first one of the switch drivers is enabled.

15 Claims, 2 Drawing Sheets

HALF BRIDGE APPARATUS AND HALF BRIDGE CONTROL METHOD

CROSS-REFERENCES TO RELATED APPLICATIONS

This application claims the priority of European Patent Application, Ser. No. EP 10169965, filed Jul. 19, 2010, pursuant to 35 U.S.C. 119(a)-(d), the content of which is incorporated herein by reference in its entirety as if fully set forth herein.

BACKGROUND OF THE INVENTION

The invention relates to a half bridge and a half bridge control method.

The following discussion of related art is provided to assist the reader in understanding the advantages of the invention, and is not to be construed as an admission that this related art is prior art to this invention.

A half bridge is a common circuit arrangement for providing an output to drive another device such as an AC motor or transformer. The half bridge includes switches for selectively switching the output between a positive and negative DC supply rail. By varying the duty cycle of the switches, that is to say, the on and off times within a given period, it is possible to provide the desired output levels to the AC motor.

The switches in the half bridge are semiconductor devices and it is conventional for these to be n type transistors. The switches are identified as high side and low side on the basis of their connection to the +DC or −DC supply rails. A problem with such arrangements is the need to provide bootstrapping to ensure that the high side switch gate drive is provided with a power supply when the low side switch is conducting. A typical prior art arrangement is shown in FIG. 1. The bootstrap capacitor C is monitored by a monitor circuit M. This is an analog circuit that reacts to the voltage difference across the capacitor C. When the potential difference is sufficient it allows operation of the gate driver.

A problem with this arrangement is that the monitor circuit needs to be added to every gate drive on the high side for each half bridge that may be required. A typical application of the half bridge in the field of DC motors will require two half bridges. Adding such monitor circuits to standard available half bridge components is undesirable since it adds to cost, and introduces the possibility of damage occurring due to manufacturing operations.

It would therefore be desirable and advantageous to address this problem and to provide an improved method and apparatus to obviate other prior art shortcomings and to enable a high-side (or low-side) signal based on the condition of the low-side (or high-side) signal to control the operation of a half-bridge network.

SUMMARY OF THE INVENTION

According to one aspect of the present invention, a half bridge adapted to be operably coupled to and responsive to respective control signals provided by a Pulse Width Modulation (PWM) controller includes a high-side switch and a low-side switch coupled to the high side and the low side output of the half bridge, switch-driving circuits operably coupled to the high-side switch and to the low-side switch in one-to-one correspondence, with the switch-driving circuits driving the switches in response to the control signals provided to the switch-driving circuits, a power supply operatively connected to the first switch-driving circuit, a power supply condition controller responsive to a model of the power supply and to at least the control signal provided to the second switch-driving circuit, with the power supply condition controller controlling the application of the respective control signal to the first switch-driving circuit.

A half bridge in accordance with one embodiment of the invention is operably coupled and responsive to a Pulse Width Modulation (PWM) controller that provides control signals to a high side switch and a low side switch that are coupled to a high side and a low side output of the bridge, respectively. The high side switch and the low side switch have respective switch driving circuits operably coupled to them that drive switches in response to respective signals provided by the PWM controller to the respective switches. A power supply is provided for the switch driving circuit on a first side of the half bridge. That power supply has a power supply condition controller responsive to a power supply model and to at least the signal provided by the PWM controller to the second side of the half bridge to control the application of the PWM signal to the switch driving circuit on the second side of the half bridge.

According to another advantageous feature of the present invention, the power supply condition controller can be operable to control an initialization of the half bridge.

According to another advantageous feature of the present invention, the power supply condition controller can be operable to prevent overload when the power supply is predicted to enter an inoperable condition.

According to another advantageous feature of the present invention, the power supply model can include at least one of the following parameters: a predicted voltage state, a voltage decay rate, or a charge rate.

According to another advantageous feature of the present invention, the power supply can include a capacitor.

According to another advantageous feature of the present invention, the power supply may be a bootstrap power supply.

According to another advantageous feature of the present invention, the switch driver and the isolation coupler may be configured as unitary components.

According to another aspect of the present invention, a method of controlling the operation of a half bridge network having a high side switch and a high side switch driver, a low side switch and a low side switch driver, and a PWM controller adapted to provide a control signal to each switch driver, includes the steps of predicting a condition of a first power supply operatively connected to the switch driver on a first side of half bridge, using a model of an operating parameter of the first power supply, and enabling the application of the control signal to the switch driver on the first side of the half bridge in the event that the predicted condition satisfies an operating condition.

According to another advantageous feature of the present invention, the signal to the other of the high side switch driver or low side switch driver can be inhibited in the event of the predicted condition satisfying a fault condition.

According to another advantageous feature of the present invention, the application of the signal to the switch driver on the first side of the half bridge can be enabled in the event that both the control signal supplied to the second side of half bridge and the predicted condition satisfy an operating condition

BRIEF DESCRIPTION OF THE DRAWINGS

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
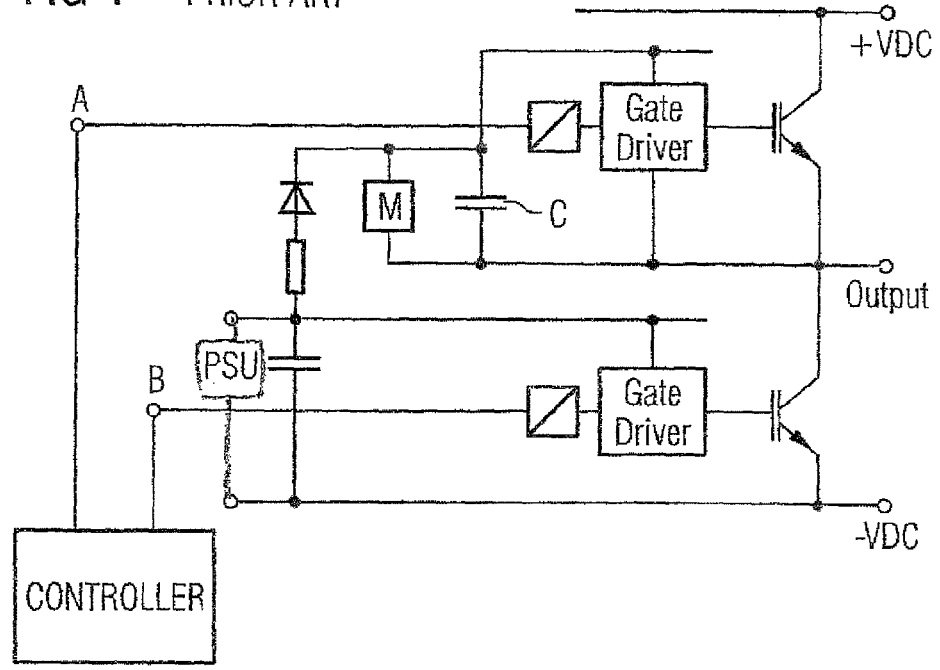
FIG. 1 is a circuit diagram of a prior art arrangement.
Figure 2:
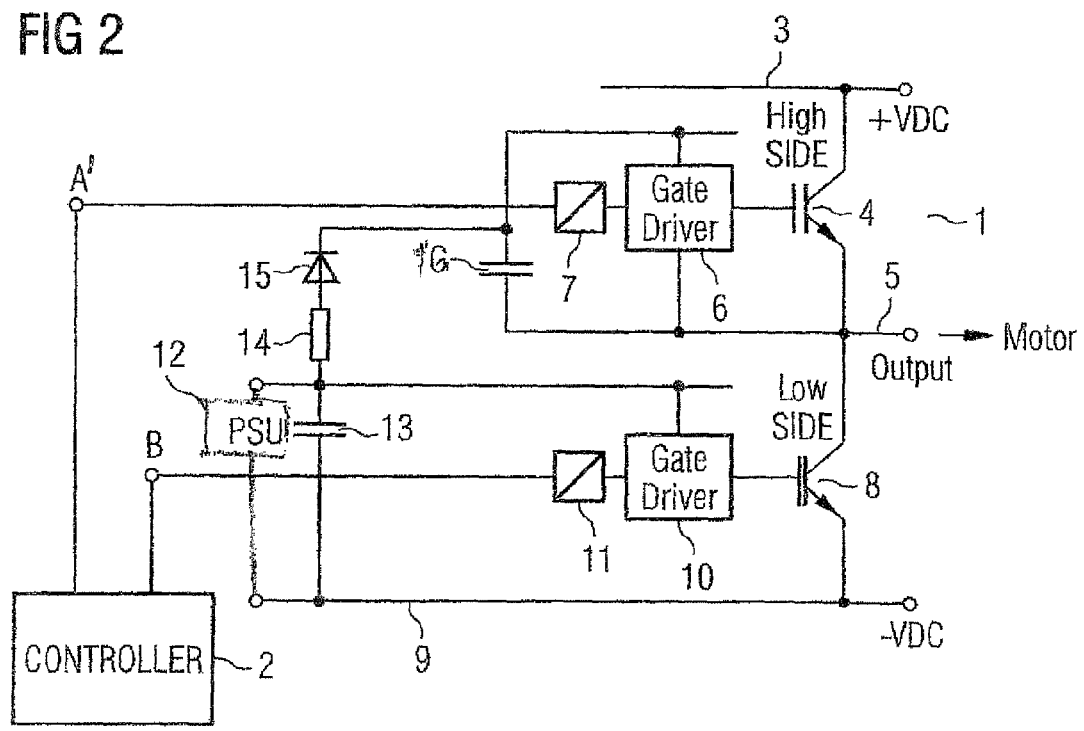
FIG. 2 is a circuit diagram of an embodiment of the present invention.

Turning now to the drawing, and in particular to FIG. 2, there is shown a circuit diagram of an embodiment of the present invention, depicting a half bridge 1 and a Pulse Width Modulation (PWM) controller 2. The half bridge 1 includes a +VDC voltage rail 3, a high-side switch 4 coupled between the voltage rail 3 and a bridge output 5. There is high-side gate driver 6 which changes the state of the switch 4 in accordance with a signal $A^1$ applied at its signal input. The signal input for the high-side gate driver 6 is coupled via an isolator 7 to the PWM controller 2.

The low side is configured in much the same way as the high-side. There is a low-side switch 8 coupled across the output 5 and a −VDC rail 9. A low-side gate driver 10 controls the operation of the low-side switch 8 in response to a signal input B coupled to it via an isolator 11 from an output of the PWM controller 2.

A power supply unit 12 is connected to the low-side gate driver 10 to provide the power required for operation of the low-side gate driver 10. A boot strapping arrangement of the capacitor 13, resistor 14, diode 15 and capacitor 16 is used to power the high-side gate driver 6. The capacitor 16 is used to store energy that is supplied to the gate driver 6 while the low-side switch 8 is in the ON state, thereby connecting the output 5 to −VDC. The capacitor 16 may therefore be considered to be the power supply circuit for the high-side gate driver 6.

The controller 2 outputs signals $A^1$ and B in order to provide the correct switching of the switches 4 and 8 to provide a desired output voltage waveform. The controller 2 is thus acting as the PWM controller of the half bridge. The controller 2 also provides other functions as will now be described below with reference to FIG. 3.

Figure 3:
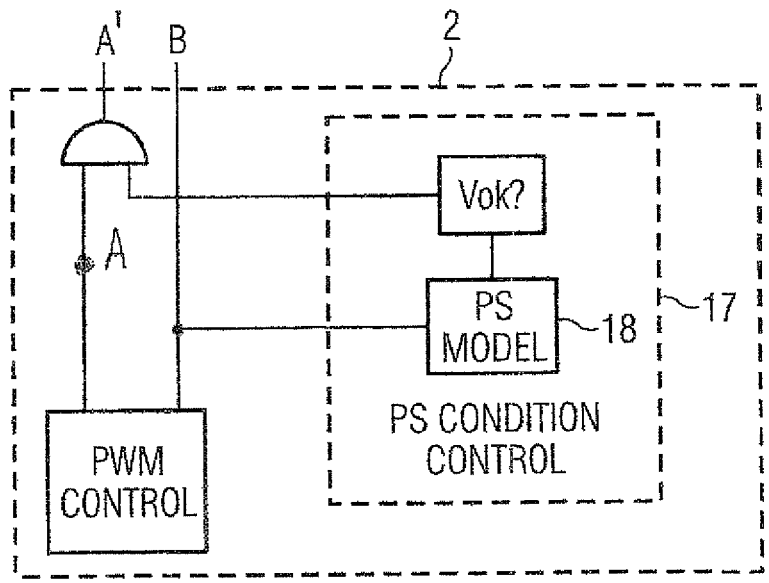
FIG. 3 is a block diagram depicting blocks of functionality provided by a controller shown in FIG. 2.

The controller 2 uses the PWM control function to produce signals A and B in a standard manner that is well known to a person skilled in the art. In FIG. 3 the signal B that is used for controlling the low side is output by the controller 2 but is also supplied to a power supply condition control function 17 within the controller 2. This control function 17 is responsive to the predicted state of the capacitor 16 used in the boot strapping arrangement that is described above, to power the high-side gate driver 6. This signal B is input to a power supply model function 18. The model uses criteria that are described later, below, to determine a predicted voltage state of the capacitor 16 on the basis of the model. If the model indicates a predicted value that is sufficient, then a voltage flag ok (Vok?) result is output. This results in a high state being placed at an input of the AND logic gate, enabling the signal $A^1$. This gated A signal, the $A^1$ signal, then enables the operation of the high-side driver 6.

The model is also be used to determine whether a malfunction exists. In the event that a malfunction exists, the signal A will be inhibited, by switching the gated signal $A^1$ that is input to the high-side gate driver 6 OFF as a result of the voltage OK flag (Vok?) being set to a negative value, thereby protecting the bridge from damage.

Figure 4:
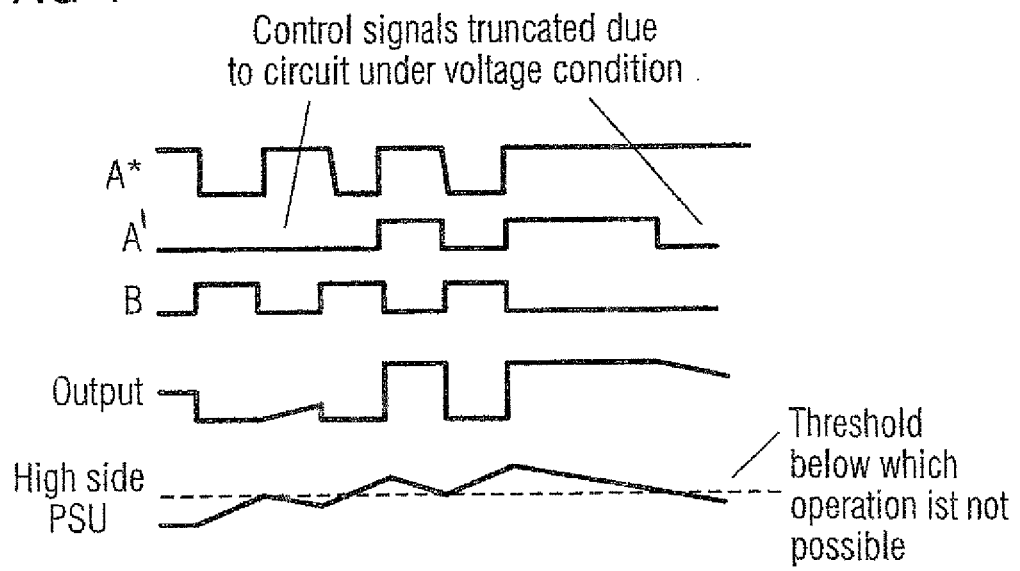
FIG. 4 is a graphical illustration to explain the operation of an arrangement according to the present invention.

FIG. 4 shows several correlated traces of various signal states that explain this method of operation. The upper signal A* is the signal necessary for providing the desired PWM. The signal below that is the actual signal $A^1$ that is output to the high-side gate driver 6 under the conditions shown at each point in time. Thus, just comparing these two signals it will be seen that, in an initial start-up phase, the $A^1$ signal delivered to the high-side gate driver 6 is low, and the driver is not switched on even though it would be switched on if the signal A* were applied. The reason for this is that the capacitor 16 has to be charged during the time that the signal B being applied to the low side is high (ON), in order to reach its operating condition.

Comparing the trace of the waveform B with that of the waveform representing the high-side capacitor 16 (PSU), it will be seen that, after the first pulse, the threshold of operation is not reached (in this case a voltage threshold). The model indicates that there will then be a decay in the voltage level, based on a predetermined operational specification of the capacitor 16 but, on the next pulse in the signal B, the high-side PSU signal will cross the operational threshold. This enables the conventional signal A to be supplied as the gated signal $A^1$ to the half bridge 1 and the "Output" signal depicted in the FIG. 4 is then produced.

FIG. 4 also illustrates the effect of a fault condition. If A remains on for more than a certain length of time, so that no B pulse is received, then the model predicts that the lack of a B pulse will cause the voltage held by capacitor 16 to decay below the operational threshold so that the gated A signal $A^1$ is then inhibited. Inhibiting A switches the high side OFF, saving the components of the half-bridge from damage.

The model that is used may be based on a number of different assumptions, depending on the component values and the way in which the motor or other device is to be driven. For example, the model may be based on the following assumptions:

i) The high-side power supply (the capacitor 16) will fully charge in ten cycles.

ii) The high-side power supply will fully discharge in one hundred cycles.

iii) It can operate providing there have been no more than forty discharge cycles.

iv) Charging and discharging occurs in a linear relationship.

v) The Pulse Width Modulation scheme has a period of twenty cycles.

Applying this model when a fifty-fifty duty cycle is applied it will be seen that, after the low-side switch is active for the first ten cycle pulses, the high-side power supply will be fully charged and will never be discharged by more than ten cycles. Thus the high-side power supply voltage will remain above the operational threshold.

If the duty cycle is changed to 100% high for one PWM period, then the high side will be active for 10+20 cycles.

If the duty cycle on the high side remains at 100% high for another PWM period, that is to say 100% for two PWM periods, then that high would be active for a total of 50 cycles. Under these conditions, 40 cycles after the high side switches on the capacitor 16 will have been discharged below the operational voltage threshold and the controller will output an inhibit flag (Vok?) to the AND logic gate, thereby switching off signal A. The output will then be allowed to float for 10 cycles until the low-side is energized again.

If a high having a duty cycle of 95% is applied then the high side will charge by 10% each cycle and discharge by 5%. The model predicts that the capacitor voltage that operates the high side will cross the operating threshold after 13 periods. After 20 periods the capacitor 16 will be fully charged.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A half bridge network adapted to be operably coupled to and responsive to respective control signals provided by a Pulse Width Modulation (PWM) controller, said half bridge network comprising:
    a high-side switch and a low-side switch coupled to the high side and the low side output of the half bridge, respectively;
    switch-driving circuits operably coupled to the high-side switch and to the low-side switch in one-to-one correspondence, said switch-driving circuits driving the respective switches in response to the respective control signals provided to the switch-driving circuits;
    a power supply circuit operatively connected to a first switch-driving circuit;
    a power supply circuit condition control circuit responsive to a model of the power supply circuit and to at least the control signal provided to a second switch-driving circuit, said power supply circuit condition control circuit controlling the application of the respective control signal to the first switch-driving circuit.

2. The half bridge network of claim 1, wherein the power supply circuit condition control circuit is operable to control an initialization of the half bridge.

3. The half bridge network of claim 1, wherein the power supply circuit condition control circuit is operable to prevent overload when the model of the power supply circuit predicts that the power supply circuit will enter an inoperable condition.

4. The half bridge network of claim 1, wherein the power supply circuit comprises a capacitor.

5. The half bridge network of claim 4, wherein the power supply circuit model includes at least one of: predicted voltage state; voltage decay rate and or charge rate.

6. The half bridge network of claim 1, wherein the power supply circuit is a bootstrap power supply.

7. The half bridge network of claim 1, wherein the switch driver and the isolation coupler are unitary components.

8. A method of controlling the operation of a half bridge network having a high side switch and a high side switch driver, a low side switch and a low side switch driver, and a PWM controller adapted to provide a control signal to each switch driver, said method comprising the steps of:
    predicting a condition of a first power supply circuit operatively connected to the switch driver on a first side of half bridge, using a model of an operating parameter of the first power supply circuit; and
    enabling the application of the control signal to the switch driver on the first side of the half bridge in the event that the predicted condition satisfies an operating condition.

9. The method of claim 8, further comprising the step of inhibiting the application of the signal to the switch driver on the first side of the half bridge in the event that the predicted condition satisfies a fault condition.

10. The method of claim 8, wherein the threshold is a voltage threshold of the power supply circuit.

11. The method of claim 10, wherein the power supply circuit includes a capacitor.

12. The method of claim 8, wherein the model includes at least one parameter selected from the group consisting of a predicted voltage state, a voltage decay rate, and a charge rate.

13. The method of claim 8, wherein the application of the signal to the switch driver on the first side of the half bridge is enabled in the event that both the control signal supplied to the second side of half bridge and the predicted condition satisfy an operating condition.

14. Pulse Width Modulation (PWM) control means adapted to be operably coupled to provide first and second control signals to respective switch-driving circuits of at least one half bridge having a first-side switch-driving circuit connected to a power supply circuit, and a second-side switch-driving circuit, the power supply circuit being operatively connected to receive power from the second-side switch-driving circuit, said PWM control means comprising:
    a pulse-width modulation control circuit operatively connected to supply a second control signal to the second switch-driving circuit;
    a power supply circuit condition control circuit responsive to a model of the power supply circuit and to the second control signal provided to the second switch-driving circuit, said power supply circuit condition controller controlling the application of a first control signal to the first switch-driving circuit.

15. The Pulse Width Modulation (PWM) control means of claim 14, wherein the pulse width modulation control circuit is located with the power supply circuit condition control circuit inside a PWM controller.

* * * * *